(12) United States Patent
Kramer et al.

(10) Patent No.: US 12,383,097 B2
(45) Date of Patent: Aug. 12, 2025

(54) TEMPERATURE CONTROLLED ACCESSORY FOR COUNTERTOP COOKING SYSTEM

(71) Applicant: SharkNinja Operating LLC, Needham, MA (US)

(72) Inventors: Ethan S. Kramer, Allston, MA (US); Ethan T. Brown, Cambridge, MA (US); Nathaniel R. Lavins, Cambridge, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/752,377

(22) Filed: May 24, 2022

(65) Prior Publication Data

US 2022/0395136 A1 Dec. 15, 2022

Related U.S. Application Data

(60) Provisional application No. 63/249,988, filed on Sep. 29, 2021, provisional application No. 63/210,322, filed on Jun. 14, 2021.

(51) Int. Cl.
*A47J 37/06* (2006.01)

(52) U.S. Cl.
CPC ....... *A47J 37/0629* (2013.01); *A47J 37/0664* (2013.01); *A47J 2202/00* (2013.01)

(58) Field of Classification Search
CPC ............... A47J 37/0629; A47J 37/0641; A47J 2202/00; F24C 7/04; F24C 7/043; F24C 7/08; F24C 7/081
See application file for complete search history.

(56) References Cited

U.S. PATENT DOCUMENTS

| 3,419,707 A | * | 12/1968 | Hild | ............ H05B 1/0216 219/391 |
| 3,585,360 A | * | 6/1971 | Young | ............ A47J 37/0623 219/408 |

(Continued)

FOREIGN PATENT DOCUMENTS

| CN | 210019026 U | 2/2020 |
| CN | 210433346 U | 5/2020 |

(Continued)

OTHER PUBLICATIONS

International Search Report for International Patent Application No. PCT/US2022/072900, mailed on Sep. 21, 2022, 14 pages.

*Primary Examiner* — Jimmy Chou
(74) *Attorney, Agent, or Firm* — Mintz, Levin, Cohn, Ferris, Glovsky and Popeo, P.C.

(57) ABSTRACT

A cooking system is provided. The cooking system includes a housing, a heating elements, a cooking accessory, a temperature sensor, and a controller. The housing has an internal heating compartment, where the heating element is positioned therein. The cooking accessory has a cooking surface and is configured to be receivable within the internal heating compartment. The temperature sensor is positioned within the internal heating compartment and configured to measure a temperature of the cooking accessory. The controller is configured to operate an output of the heating element. The output of the heating element is related to the measured temperature of the cooking accessory and independent of an air temperature of the internal heating compartment.

19 Claims, 7 Drawing Sheets

(56) References Cited

U.S. PATENT DOCUMENTS

| | | | |
|---|---|---|---|
| 4,315,138 A * | 2/1982 | Miwa | G05D 23/26 99/333 |
| 4,431,906 A * | 2/1984 | Oota | G05D 23/24 99/333 |
| 5,283,854 A * | 2/1994 | Schiebelhuth | H05B 3/82 392/467 |
| 5,938,959 A * | 8/1999 | Wang | A47J 37/0629 219/403 |
| 6,670,591 B2 | 12/2003 | Shon et al. | |
| 6,734,403 B2 | 5/2004 | Baker et al. | |
| 6,928,379 B2 | 8/2005 | Fulton et al. | |
| 6,943,321 B2 | 9/2005 | Carbone et al. | |
| 7,060,940 B2 | 6/2006 | Kim et al. | |
| 7,309,846 B2 | 12/2007 | Haberkamm et al. | |
| 7,750,271 B2 | 7/2010 | Smith et al. | |
| 7,750,272 B2 | 7/2010 | Furlanetto et al. | |
| 8,299,406 B2 | 10/2012 | Zhou et al. | |
| 8,378,265 B2 | 2/2013 | Greenwood et al. | |
| 8,415,591 B2 | 4/2013 | Boyer et al. | |
| 8,614,408 B2 | 12/2013 | Kamii | |
| 8,674,270 B2 | 3/2014 | Anderson et al. | |
| 8,731,385 B2 | 5/2014 | De Luca | |
| 8,859,941 B2 | 10/2014 | Gladhill et al. | |
| 9,089,005 B2 | 7/2015 | Boedicker et al. | |
| 9,267,692 B2 | 2/2016 | Cescot et al. | |
| 9,395,088 B2 | 7/2016 | Wiggins et al. | |
| 9,395,089 B2 | 7/2016 | Nelson et al. | |
| 9,418,528 B2 | 8/2016 | Stokes | |
| 9,474,413 B2 | 10/2016 | Romandy | |
| 9,554,421 B2 | 1/2017 | Meusburger | |
| 9,643,037 B2 | 5/2017 | Vermeersch et al. | |
| 9,920,934 B2 | 3/2018 | Donarski et al. | |
| 9,927,127 B2 | 3/2018 | Johnson et al. | |
| 10,082,297 B2 | 9/2018 | Kim et al. | |
| 10,244,778 B2 | 4/2019 | Armstrong et al. | |
| 10,405,696 B2 | 9/2019 | Kim | |
| 10,520,199 B2 | 12/2019 | Polster | |
| 10,598,549 B2 | 3/2020 | Hedlund et al. | |
| 10,731,869 B2 | 8/2020 | Ghiglieri et al. | |
| 10,865,999 B2 | 12/2020 | Neal | |
| 11,071,404 B2 | 7/2021 | Yan et al. | |
| 11,103,326 B2 | 8/2021 | Bettencourt | |
| 11,105,514 B2 | 8/2021 | Lim et al. | |
| 11,175,048 B2 | 11/2021 | Murad | |
| 11,627,834 B2 * | 4/2023 | Gill | A23L 5/17 99/330 |
| 2004/0040447 A1 * | 3/2004 | Lee | H05B 6/645 99/446 |
| 2012/0152126 A1 * | 6/2012 | Robinson | A47J 37/0611 99/331 |
| 2014/0021191 A1 * | 1/2014 | Moon | A47J 37/0629 34/220 |
| 2014/0227401 A1 * | 8/2014 | Kounlavong | A47J 27/09 220/203.11 |
| 2016/0040892 A1 * | 2/2016 | Wiseman | F24C 7/081 219/412 |
| 2016/0095469 A1 * | 4/2016 | Gregory | F24C 15/166 99/421 H |
| 2016/0143471 A1 * | 5/2016 | Kounlavong | A47J 27/09 219/431 |
| 2016/0183586 A1 * | 6/2016 | Min | A23N 12/10 99/324 |
| 2016/0255997 A1 * | 9/2016 | Romandy | H01R 13/73 |
| 2017/0089590 A1 * | 3/2017 | Bruin-Slot | F24C 15/166 |
| 2018/0142900 A1 | 5/2018 | McKee et al. | |
| 2018/0224127 A1 | 8/2018 | Lambert et al. | |
| 2018/0259191 A1 * | 9/2018 | Polster | A23L 5/15 |
| 2019/0045964 A1 | 2/2019 | Gill et al. | |
| 2019/0159288 A1 | 5/2019 | Warwick | |
| 2019/0254471 A1 | 8/2019 | Reinhard-Herrscher et al. | |
| 2019/0254473 A1 | 8/2019 | Anthony et al. | |
| 2019/0254474 A1 * | 8/2019 | Anthony | A47J 37/0629 |
| 2019/0357319 A1 | 11/2019 | Bassill et al. | |
| 2020/0281391 A1 | 9/2020 | Swayne et al. | |
| 2021/0270467 A1 | 9/2021 | Murad | |
| 2021/0372630 A1 | 12/2021 | Murad | |
| 2022/0065459 A1 | 3/2022 | Murad | |
| 2022/0120445 A1 | 4/2022 | Murad | |
| 2022/0142402 A1 * | 5/2022 | Staun | A47J 27/04 |
| 2022/0186937 A1 | 6/2022 | Murad | |

FOREIGN PATENT DOCUMENTS

| | | | |
|---|---|---|---|
| CN | 112386119 A | 2/2021 | |
| CN | 113317691 A | 8/2021 | |
| EP | 3003104 B1 | 9/2019 | |
| EP | 3003107 B1 | 9/2019 | |
| JP | H10201640 A | 8/1998 | |
| JP | 5785412 B2 * | 9/2015 | A47J 37/06 |
| WO | 2015138985 A1 | 9/2015 | |
| WO | 2019223963 A1 | 11/2019 | |
| WO | 2020148329 A1 | 7/2020 | |
| WO | 2020177410 A1 | 9/2020 | |
| WO | 2020245087 A1 | 12/2020 | |

* cited by examiner

TEMPERATURE CONTROLLED ACCESSORY FOR COUNTERTOP COOKING SYSTEM

CROSS-REFERENCE TO RELATED APPLICATIONS

This application claims priority to U.S. Provisional Patent Application No. 63/210,322 filed Jun. 14, 2021 and entitled "TEMPERATURE CONTROLLED ACCESSORY FOR COUNTERTOP COOKING SYSTEM," and U.S. Provisional Patent Application No. 63/249,988 filed Sep. 29, 2021 and entitled "TEMPERATURE CONTROLLED ACCESSORY FOR COUNTERTOP COOKING SYSTEM," the entire contents of which are hereby expressly incorporated by reference herein.

FIELD

The present disclosure relates generally to a cooking system, and more particularly, to a temperature-controlled cooking surface arranged within an internal cooking chamber of a countertop cooking system.

BACKGROUND

Existing countertop cooking systems, such as toaster ovens for example, may be used to conveniently warm or cook food in place of a larger wall mounted oven or a range for example. In conventional countertop cooking systems, food is typically positioned on a thin plate arranged within an internal chamber of the cooking system. However, these thin plates typically do not provide good contact to sear the food being cooked due to one or more of poor heat distribution, poor heat storage, and poor temperature regulation. The use of a thicker plate is sufficient to overcome some of these issues, such as heat storage and distribution. However, after the initial food load is applied, the temperature of the plate drops significantly, and the cooking system is unable to effectively monitor or regulate the plate temperature.

Accordingly, there is a need to regulate a temperature of both the cooking chamber of the countertop cooking system and the temperature of the plate or cooking surface. Because the temperature of the cooking chamber is related to the temperature of the plate, it can be difficult to independently control these temperatures. For example, by heating one region, another region may be inadvertently overheated. This may result in food being burned on the bottom while undercooked on top, or alternatively, a raw bottom, and an overcooked top.

SUMMARY

Cooking systems having a temperature-controlled cooking surface arranged within an internal cooking chamber for cooking food are provided.

In one embodiment, a cooking system is provided having a housing, a heating element, a cooking accessory, a temperature sensor, and a controller. The housing can have an internal heating compartment. The heating element can be positioned within the internal heating compartment. The cooking accessory can have a cooking surface and can be configured to be received within the internal heating compartment. The temperature sensor can be positioned within the internal heating compartment and can be configured to measure a temperature of the cooking accessory. The controller can be configured to operate an output of the heating element. The output of the heating element can be related to the measured temperature of the cooking accessory and independent of an air temperature of the internal heating compartment.

In some embodiments, the heating element can be positioned vertically between a bottom surface of the internal heating compartment and the cooking accessory.

In some embodiments, a second temperature sensor can be positioned within the internal heating compartment and it can be configured to measure the air temperature of the internal heating compartment. In other embodiments, a second heating element can be positioned within the internal heating compartment and vertically above the cooking accessory. In certain embodiments, an output of the second heating element can be related to the measured air temperature of the internal heating compartment. In other embodiments, the output of the first heating element can be independent from the output of the second heating element.

The temperature sensor can have a variety of configurations. For example, in some embodiments, the temperature sensor can be mounted within an aperture positioned in a rear wall of the internal heating compartment. In some embodiments, the temperature sensor can be movable relative to the internal heating compartment. In other embodiments, the temperature sensor can be movably biased in a first direction. In certain embodiments, the cooking accessory can be configured to be inserted into the internal heating compartment in a second direction, opposite the first direction. In other embodiments, the cooking accessory can be configured to directly contact the temperature sensor when inserted into the internal cooking compartment. In certain embodiments, the temperature sensor can be configured to move relative to the internal heating and remain in contact with the cooking accessory.

In another embodiment, a cooking system is provided having a housing having an internal heating compartment. A cooking accessory can have a cooking surface and can be configured to be received within the internal heating compartment. A first heating element can be positioned within the internal heating compartment below the cooking accessory. A second heating element can be positioned within the internal heating compartment above the cooking accessory. A first temperature sensor can be positioned within the internal heating compartment and it can be configured to directly contact and measure a temperature of the cooking accessory. A second temperature sensor can be positioned within the internal heating compartment and it can be configured to measure an air temperature of the internal heating compartment. A controller can be configured to operate an output of the first heating element and an output of the second heating element. The output of the first heating element can be related to the measured temperature of the cooking accessory, and the output of the second heating element can be related to the measured air temperature of the internal heating compartment.

In some embodiments, the output of the first heating element can be independent of the output of the second heating element.

In some embodiments, the first temperature sensor can be aligned with the cooking accessory along an insertion axis of the cooking accessory.

In some embodiments, the first temperature sensor can be movable relative to the internal heating compartment.

In another embodiment, a method of operating a cooking system is provided. The method can include measuring a surface temperature of a cooking accessory arranged within an internal heating compartment of a housing by a first temperature sensor, measuring an air temperature of the internal heating compartment of the cooking system by a second temperature sensor, the monitoring of the surface temperature of the cooking accessory being independent from the monitoring of the air temperature of the internal heating compartment, and controlling a present surface temperature of the cooking accessory in response to the measured surface temperature of the cooking accessory independent of the measured air temperature of the internal heating compartment.

In some embodiments, the method can further include directly contacting the first temperature sensor with the cooking accessory. In some embodiments, the method can further include controlling a present air temperature of the internal heating compartment in response to the measured air temperature of the internal heating compartment independent of the measured surface temperature of the cooking accessory.

In some embodiments, the controlling of the temperature of the cooking accessory can further include adjusting an output of a first heating element arranged between the cooking accessory and a bottom surface of the internal heating compartment.

BRIEF DESCRIPTION OF THE FIGURES

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

A cooking device is provided having multiple temperature sensors and heaters in order to achieve multiple cooking modes. In an exemplary embodiment, the cooking device includes air frying, sear crisping, rapid baking, air roasting, and broiling cooking modes, where each mode can require a different conductive cooking surface temperature and convective air temperature in order to achieve a desired result. Therefore, the present invention includes temperature regulation within the cooking device for both air and cooking surface temperatures, compared to a traditional oven where air temperature and cooking surface temperature are linked together and cannot be independently controlled. The lack of independent control of both conductive and convective heating can lead to the under-heating of one region while overheating of another region, leading to a food product burning on the bottom while the top is undercooked, or a raw bottom with charred top. The present invention solves these issues by not only having independent temperature control of different heating elements, but also being able to precisely monitor the cooking surface and air temperatures independently, and then adjusting the heating output in only regions where it is needed. It is important monitor the temperatures within the cooking device consistently not only to achieve a desired result, but also to increase a cooking process efficiency and to reduce smoke generation within the cooking device. Accordingly, the cooking device can independently monitor and control different cooking region to precisely provide precise conduction and convection heating to a food product.

Figure 1:
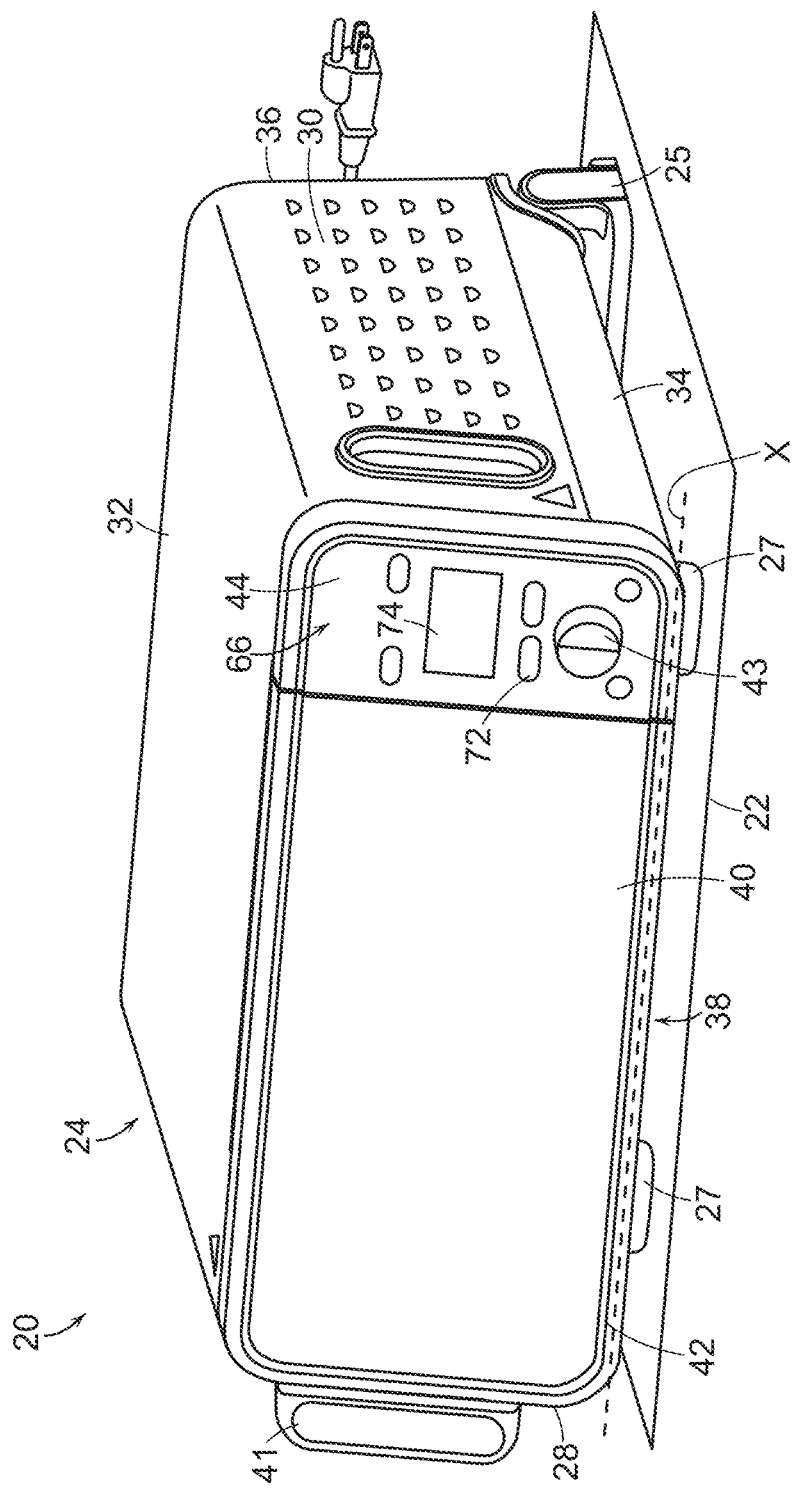
FIG. 1 is a front perspective view of one embodiment of a cooking system.
Figure 2:
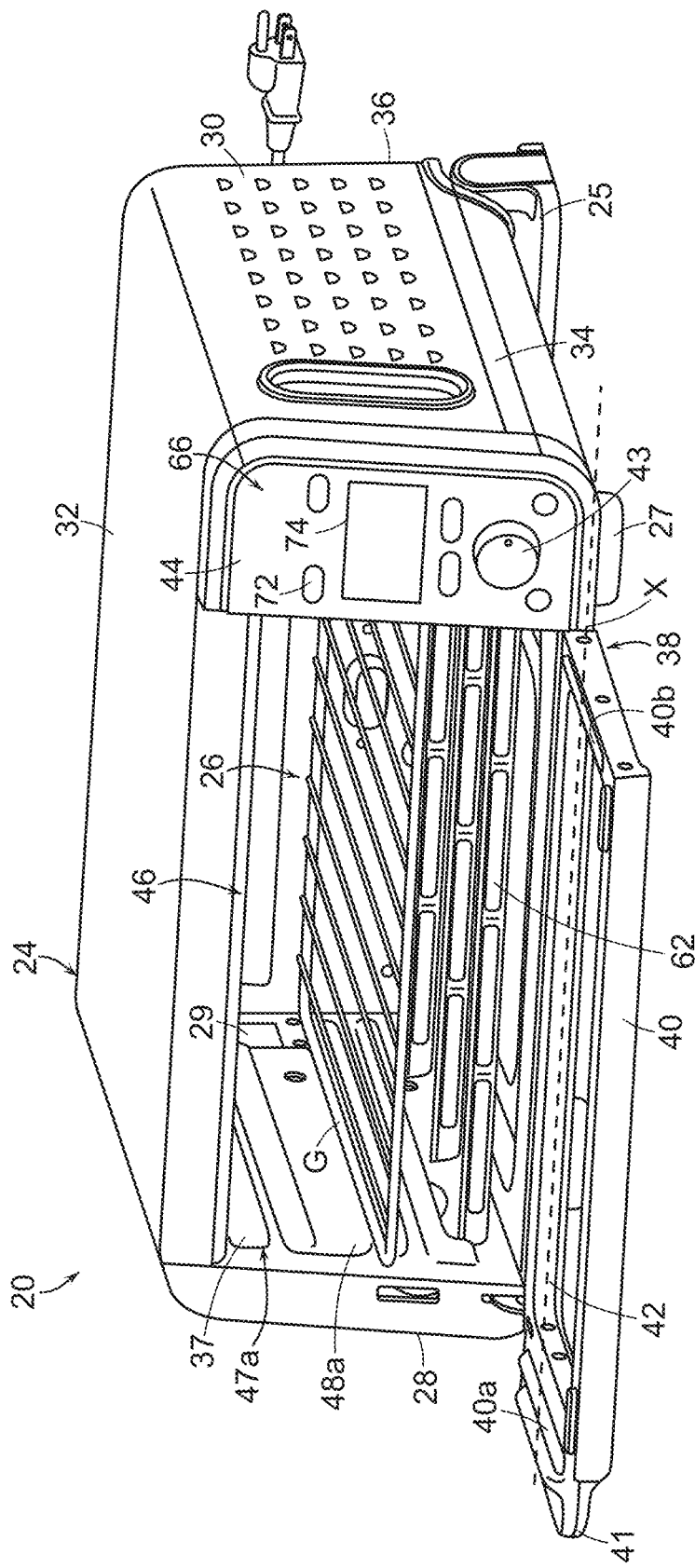
FIG. 2 is a front perspective view of the cooking system of FIG. 1 with a door in an open position.

FIGS. 1 and 2 illustrate one exemplary embodiment of a cooking system 20 configured to be positioned on a support surface 22, such as a countertop. The cooking system 20 generally includes a thermally insulated housing 24 that defines an internal heating compartment or cooking volume 26. The housing 24 can be formed from a left exterior sidewall 28, a right exterior sidewall 30, a top exterior wall 32, a bottom exterior wall 34, and a rear exterior wall 36. The exterior walls 28, 30, 32, 32, and 36 can be connected to form of a hollow box, where the internal heating compartment 26 is defined therein. In one aspect, the exterior walls 28, 30, 32, 32, and 36 can be formed from stamped sheet metal secured together.

The housing 24 can include traditional support feet arranged on the bottom exterior wall 34, where the cooking system 20 remains in an operational position at all times. However, in one aspect, as illustrated in FIG. 1, a base 25 and support feet 27 can be arranged on the exterior of the housing 24. The housing 24 can pivot about the base 25 in order to lift the feet 27 of the housing 24 off the support surface 22. This pivoting action allows the housing 24 to be moved to a vertical orientation, thus allowing a user to reduce the occupied space of the cooking system 20 when not in use.

As mentioned above, the housing 24 forms an internal heating compartment 26 which is accessible through an opening 46 in the housing 24. In order to seal the opening 46 of the internal heating compartment 26 for thermal efficiency, the housing 24 includes a front wall 38 through which the internal heating compartment 26 is accessed by a user. The front wall 38 of the housing 24 may be formed as a moveable door 40 that is movable relative to the remainder of the housing 24 to selectively provide access to the internal heating compartment 26. The illustrated door 40 is a rectangular plate mounted in overlapping arrangement with the opening 46 in the housing 24 to seal the internal heating compartment 26. In one aspect, the door 40 can include a transparent plate, e.g., glass, arranged within a frame such that a user can see into the internal heating compartment 26 during operation of the cooking system 20. In order to further seal the internal heating compartment, gaskets 40a, 40b (shown in FIG. 2) can be arranged on the inside surface of the door and can contact the housing 24 when the door 40 is in the closed positon.

The door 40 is hinged to the housing 24 along a bottom edge 42 thereof for rotation about a hinge axis X between an open position (shown in FIG. 2) and a closed position (shown in FIG. 1). Although the hinge axis X is illustrated as being located at a bottom edge 42 of the door 40, in other embodiments the hinge axis X can be positioned at an upper edge or a side edge of the door 40. The door 40 may include a handle 41 arranged on the door 40 to facilitate movement of the door 40 relative to the housing 24 by a user. In one aspect, the handle 41 is illustrated at a left side of the door 40. However, embodiments where the handle 41 is arranged at another location about the door 40, such as a top edge thereof for example, are also within the scope of the disclosure. Further, although the door 40 is described as being pivotable about a hinge axis X, it should be understood that embodiments where the door 40 is configured to translate relative to the housing 24, or where the door 40 is removably coupled to the housing 24 are also contemplated herein.

In certain aspects, the movable door 40 may be replaced by a slidable or drawer-like mechanism that is receivable within the interior of the housing 24. In other aspects, the housing 24 may have an open top surface and a lid movable to selectively close and/or seal the open top surface. However, it should be understood that embodiments where the housing 24 does not include a front wall 38 and the internal heating compartment 26 is open to the environment are also within the scope of the disclosure.

In certain aspects, the door 40 may define the entire front wall 38 of the housing 24. However, in other aspects, the door 40 may define only a portion of the front wall 38, and the front wall 38 may further include a panel 44 located adjacent to one or more sides of the door 40. As illustrated in FIGS. 1 and 2, the panel 44 may be positioned adjacent the right exterior sidewall 30, and can extend between the top and bottom exterior walls 32, 34, respectively of the housing 24. It should be understood that the panel 44 can be located anywhere on the housing 24.

Figure 4:
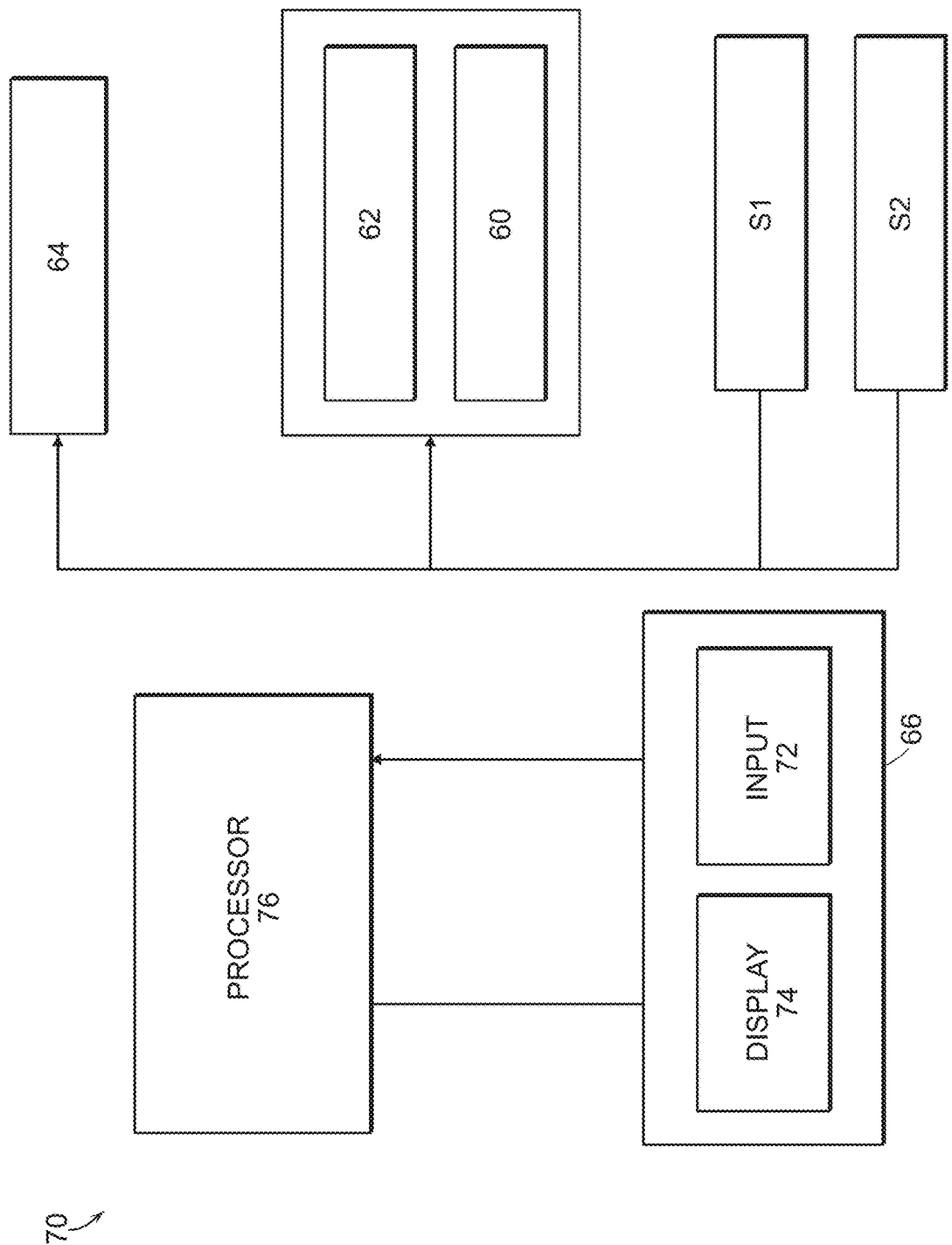
FIG. 4 is a schematic diagram of a control system of the cooking system of FIG. 1.

As illustrated in FIGS. 1, 2, and 4, arranged on the panel 44 is a user interface 66 for operating the cooking system 20. The user interface 66 is part of a control system 70 that is electrically connected to various powered components within the cooking device. The illustrated user interface 66 includes one or more inputs 72 associated with operating the cooking system 20 and for selecting various modes of operation of the cooking system 20. One or more of the inputs 72 may include a light or other indicator to show that the respective input 72 has been selected. The user interface 66 may additionally include a display 74 separate from and associated with the at least one input 72. However, embodiments where the display 74 is integrated into the at least one input 72 are also contemplated herein. Also arranged on the panel 44 is a dial 43 which can be configured to input user selections.

In one aspect, at least one input 72 on the user interface 66 is an on/off button or switch which allows the user to activate or deactivate the user interface 66. When the user interface 66 is deactivated, none of the heating elements or air movement device are energized. The at least one input 72 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input has been selected and any necessary information has been provided to the user interface 66. One or more of the other inputs 72, such as the dial 43, may be operable, such as by pushing the dial 43 towards the user interface 66, to start and stop operation of the cooking system 20, regardless of whether the cooking system 20 is following a stored sequence or is in a manual mode.

The one or more inputs 72 are operable to initiate operation of the cooking system 20 in a plurality of cooking modes. Examples of modes of operation of the cooking system 20 include, but are not limited to, toast, bake, broil, grill, warm, reheat, and steam cook. As explained in detail below, independent control of heating elements allows a user to configure a cooking/heating cycle based on the type of food item positioned within the internal heating compartment 26.

Additionally, the at least one input 72 is operable to select one or more manual modes of operation of at least one of the heating elements. Alternatively, or in addition, the at least one input 72 is operable to select a stored sequence of operation of at least one heating element. In some cases, the stored sequences may be particularly well suited for a given method of food preparation and/or for particular ingredients or types of ingredients. The plurality of stored sequences associated with the at least one input 72 may be stored within a memory accessible by the processor 76. Alternatively, the plurality of stored sequences may be stored remotely from the cooking system 20, and may be accessed by the processor 76, such as via wireless communication.

In addition, a user may be able to enter or select a time associated with operation of the cooking system 20 in a desired manual mode. The time may be entered via the same input 72, or a separate input 72 as used to select a mode of operation. Where the cooking system 20 is in a mode configured to perform a stored sequence in response to selection of one of the inputs, the display 74 may indicate a time remaining on the display 74. Temperature or other parameters, such as toasting color for example, may also be entered via inputs 72.

Since the user interface 66 is configured to receive multiple user inputs, the inputs 72 and display 74 are communicatively coupled to the processor 76. As shown in FIG. 4, the control system 70 includes a controller or processor 76 for controlling operation of heating elements 60, 62, an air movement assembly 90 including a fan 64, and sensors S1, S2, which will be explained in detail below. These components operate in response to a user input provided via the one or more inputs 72 and use algorithms to execute stored sequences of heating operations. A heating output of one or more of the heating elements 60, 62 is controlled by the processor 76 and may be variable in response to the power supplied to the heating elements 60, 62. In certain aspects where the cooking system 20 includes a plurality of heating elements 60, 62, the heating elements 60, 62 may be independently operable. The sensors S1, S2 are also arranged in communication with the processor 76 and operable to monitor one or more parameters, for example a temperature within the internal heating compartment 26 or a cooking surface temperature.

Figure 3:
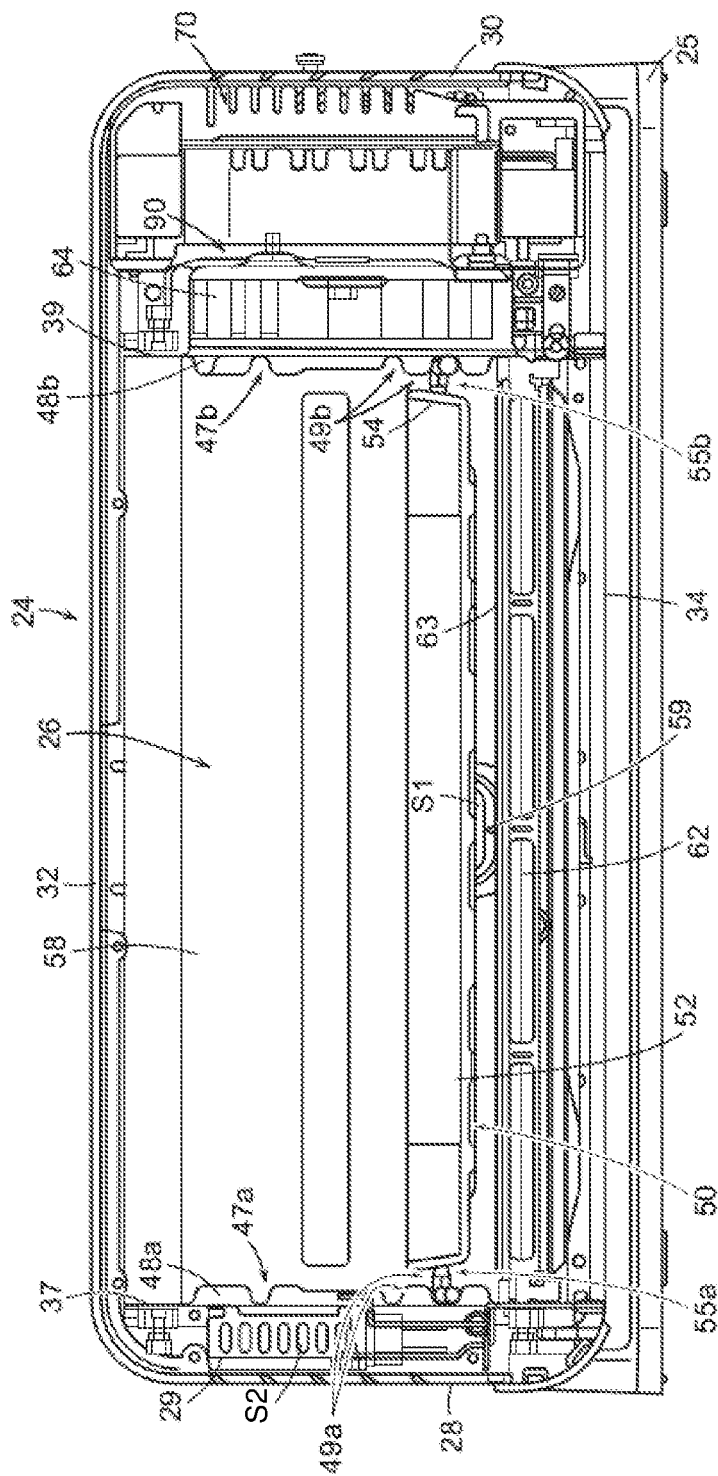
FIG. 3 is a cross-sectional front view of the cooking system of FIG. 1 with a cooking accessory arranged therein.

With reference now to FIG. 3, the internal heating compartment 26 includes inner sidewalls 37, 39, and a rear inner wall 58. The inner sidewalls 37, 39 and the rear wall 58 are spaced apart from the exterior walls 28, 30, 32 in order to provide an insulating area between the internal heating compartment 26 and the exterior walls 28, 30, 32. A support assembly 47a is arranged on the inner sidewall 37 and is formed from projections 48a extending inward to the internal heating compartment 26 from the inner sidewall 37 and extending along the length of the inner sidewall 37 from the front to the back of the device. Similar to the support assembly 47a, the inner sidewall 39 includes a support assembly 47b, formed from projections 48b extending inward to the internal heating compartment 26 from the inner sidewall 39. Formed between the projections 48a, 48b are channels 49a, 49b arranged at different height levels within the internal heating compartment 26. The support assemblies 47a, 47b may be integrally formed with the inner sidewalls 37, 39, such as the projections 48a, 48b being stamped directly in the sheet forming the inner sidewalls 37, 39.

The support assemblies 47a, 47b are positioned to support one or more cooking accessories 50, such as a removable cooking rack G (shown in FIG. 2), a basket, a spit, a drip tray, or a griddle (shown in FIG. 3) for example, at a desired position within the internal heating compartment 26. The support assemblies 47a, 47b may support the cooking accessories directly or indirectly, such as if the cooking accessory is arranged within a movable cooking container that is also receivable within the internal heating compartment 26 of the housing 24. In one aspect, multiple cooking accessories can be supported within the channels 49a, 49b of the support assemblies 47a, 47b at different heights. However, any type of fixture capable of supporting a cooking accessory within the internal heating compartment 26 is contemplated herein.

Figure 5:
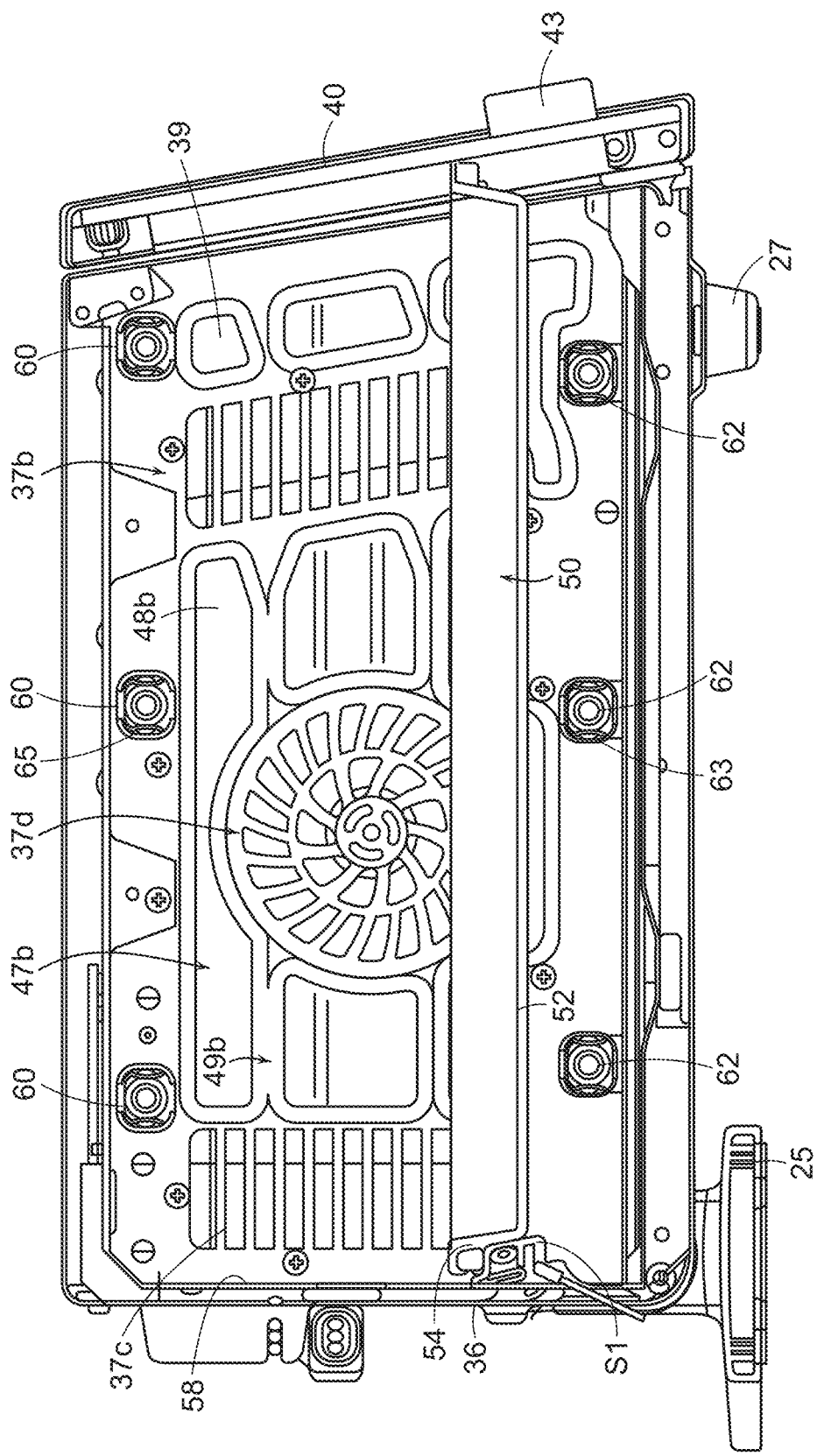
FIG. 5 is a side cross-sectional view of the cooking system of FIG. 1.

As stated above, the internal heating compartment 26 of the housing 24 is heated by at least one heating element. In an aspect, the cooking system 20 includes at least one first heating element 60 positioned within the internal heating compartment 26, for example adjacent the top wall 32 of the housing 24. As illustrated in FIG. 5, the cooking system 20 includes a plurality of first heating elements 60, such as three first heating elements, oriented generally parallel to the hinge axis X and spaced across a depth of the top wall 32 of the housing 24 or internal heating compartment 26. It should be understood that any number of first heating elements 60 and any configuration of the first heating elements 60 are contemplated herein. Alternatively, or in addition, at least one second heating element 62 may be positioned within the internal heating compartment 26, for example adjacent the bottom 34 of the housing 24. The illustrated cooking system 20 includes a plurality of second heating elements 62, such as three second heating elements, oriented generally parallel to the hinge axis X and spaced across a depth of the bottom 34 of the housing 24 or internal heating compartment 26. The first heating elements 60 and the second heating elements 62 may be generally aligned or may be staggered relative to one another. It should be understood that although the heating elements 60, 62 of the cooking system 20 are illustrated and described as being positioned generally adjacent the top wall 32 and bottom wall 34 of the housing 24, respectively, embodiments where the cooking system 20 alternatively or additionally includes one or more heating elements (not shown) located adjacent one or more lateral sides of the internal heating compartment 26 and/or within a center of the internal heating compartment 26 are also contemplated herein.

As further shown, guards 63, 65 can be positioned about the length of each of the heating elements 60, 62 and they can be configured to protect the heating elements 60, 62 from food product which may fall from a cooking accessory. The guards 63, 65 can include apertures and slots to ensure infrared heat is able to pass around the guards 63, 65 and properly heat the air within the internal heating compartment 26 and a cooking accessory.

In one aspect, the position of some or all of the heating elements 60, 62 within the internal heating compartment 26 and the position at which a cooking accessory, such as the cooking accessory 50 shown in FIG. 5, is received within the internal heating compartment 26, in particular relative to one or more of the heating elements 60, 62, can be optimized. For example, the respective positions may be selected to balance the speed and efficiency of heat transfer from the heating elements 60, 62 to the cooking accessory while maximizing the uniformity of temperature across the cooking surface 52 of the cooking accessory.

The one or more heating elements 60, 62 of the cooking system 20 may be selected to perform any suitable type of heating, including but not limited to, conduction, convection, radiation, and induction. Accordingly, the at least one heating element 60, 62 may be any type of heating element, such as a tubular, quartz, tungsten, or halogen heating element for example. At least one of the plurality of heating elements 60, 62 of the cooking system 20 may be a quartz infrared heating element. In an aspect, the cooking system 20 includes a plurality of second heating element 62 and all of the second heating elements 62 are quartz infrared heating elements. The at least one first heating element 60 may also be a quartz infrared heating element, or alternatively, may be another type of heating element, such as a calrod heating element for example. In operation, a quartz infrared heating element is configured to transfer a large portion or amount of energy via radiation and a smaller portion of energy via convection. This is distinguishable from other countertop cooking systems which commonly use heating elements, such as calrod heating elements for example, configured to transfer heat primarily via convection and secondarily via radiation. However, in one aspect, the use of calrods can be used and should be considered within the scope of this disclosure.

It should be understood that in embodiments of the cooking system 20 having a plurality of heating elements 60, 62 arranged at multiple locations within the internal heating compartment 26, the plurality of heating elements 60, 62 may be substantially identical, or alternatively, may be different, and further may be operable to perform similar or distinct types of heating. In an embodiment, both the first and second heating elements are radiant heating elements. However, heating elements operable to perform other combinations of heating are contemplated herein. Further, as stated above, the cooking system 20 may additionally include a fan 64 operable in conjunction with or independently of the heating elements 60, 62 to circulate air or another fluid through the internal heating compartment 26.

As stated above, the cooking system 20 may include one or more sensors, such as a temperature sensor S1, S2 for monitoring conditions within the internal heating compartment 26. The temperature sensors S1, S2 may be configured to communicate with the processor 76 either wirelessly or via one or more wires, such as embedded within the housing 24, external to the internal heating compartment 26. The illustrate cooking system 20 includes a first temperature sensor S1 configured to monitor a temperature of a cooking accessory 50 positioned within the internal heating compartment 26, such as the cooking surface 52 of a cooking accessory 50. In certain aspects, the temperature sensor S1 may directly contact a surface of the cooking accessory to determine the temperature thereof. However, embodiments where the temperature sensor S1 is configured to indirectly contact a surface of the cooking accessory 50 are also within the scope of the disclosure.

As illustrated in FIG. 5, the first temperature sensor S1 is arranged at a rear inner wall 58 of the internal heating compartment 26. Accordingly, as a cooking accessory is inserted into the internal heating compartment 26, a portion of the cooking accessory, for example an edge, wall, cooking surface and/or bottom surface thereof, is configured to contact the temperature sensor S1. By contacting the temperature sensor S1 directly, the temperature sensor S1 can measure the temperature of the cooking accessory, which directly relates to a searing process of a food product arranged on the cooking accessory.

Figure 5A:
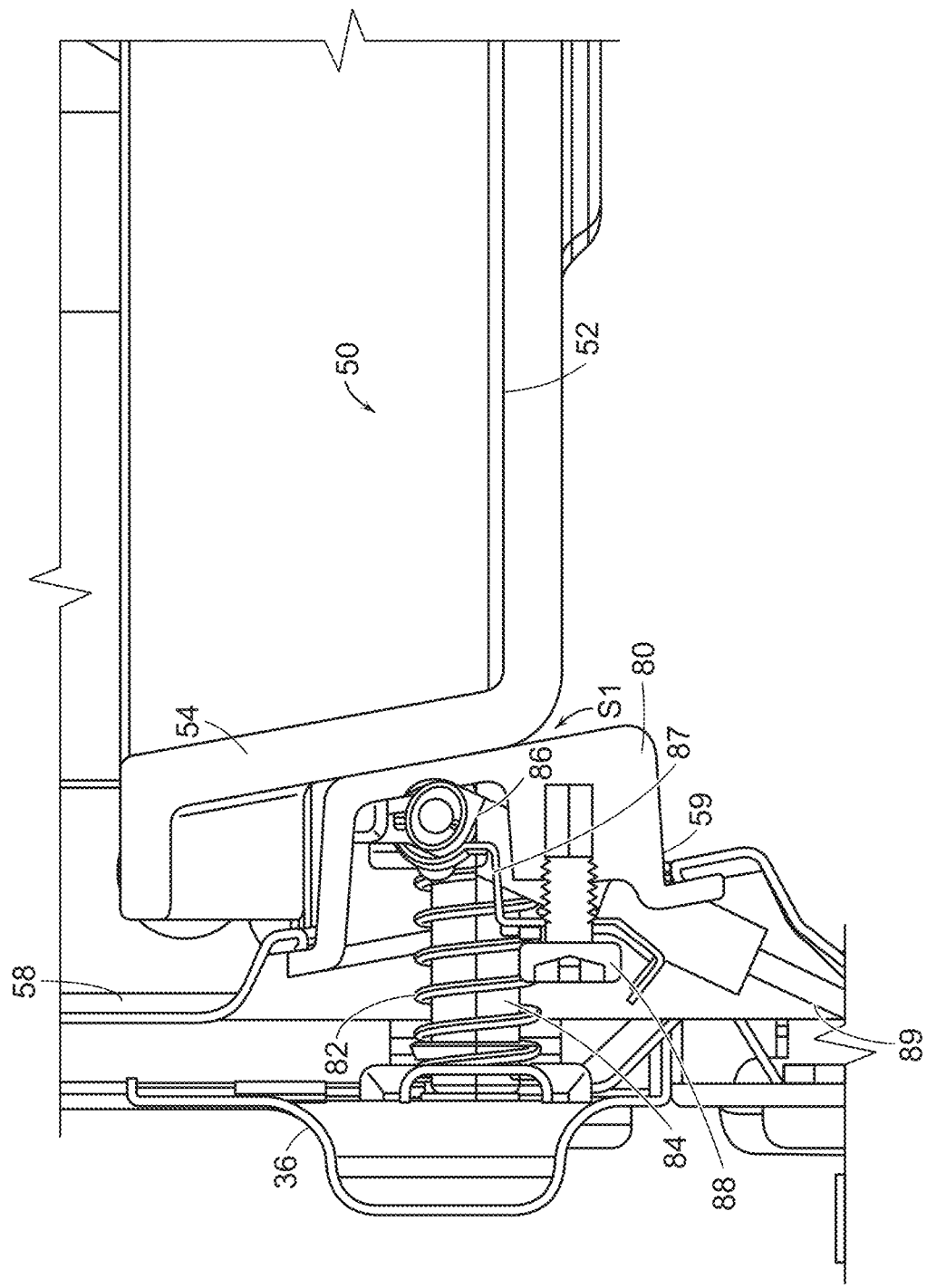
FIG. 5A is a detailed cross-sectional view of a temperature sensor and the cooking accessory of FIG. 5.

In one aspect, the temperature sensor S1 may be movably mounted with respect the internal heating compartment 26. As illustrated in FIG. 5A, the temperature sensor S1 may be arranged within a housing 80 that extends through an aperture 59 arranged within the rear inner wall 58. A sensor body 86 is arranged within the housing 80 and configured to contact the inside surface of the housing 80 such that there is a direct connection between the sensor body 86 and the cooking accessory 50 via the housing 80. The sensor body 86 is held in place against the inner surface of the housing 80 by a bracket 87 and a bolt 88. Additionally, a wire 89 connects the sensor body 86 to the processor 76

In order to protect the electronics of the temperature sensor S1 and to ensure a good direct connection is made between the housing 80 and the cooking accessory 50, the housing 80 can move relative to the rear inner wall 58 via at least one biasing mechanism 82, such as a coil spring for example. As the cooking accessory 50 is installed within the internal heating compartment 26, the cooking accessory 50 engages the housing 80 of the temperature sensor S1. As a result of this engagement, the temperature sensor S1 and the cooking accessory 50 move in combination toward the rear exterior wall 36, in a direction opposing the force of the biasing mechanism 82. In one aspect, the biasing force is parallel to an insertion axis, which is perpendicular to the hinge axis X. The movement of the temperature sensor S1 relative to the internal heating compartment 26 facilitates engagement with the cooking accessory 50 even when the cooking accessory 50 is not fully inserted into the compartment. Further, by allowing the temperature sensor S1 to move relative to the internal heating compartment 26, damage to a surface or coating applied to the cooking accessory 50 as a result of engagement with the temperature sensor S1 may be avoided while also ensuring good thermal contact between the temperature sensor S1 and the cooking accessory 50. Embodiments of the cooking system 20 having a temperature sensor S1 configured to monitor a temperature of the cooking surface 52, but that is fixedly mounted and/or is arranged at another location within the internal heating compartment 26, such as adjacent to one of the sidewalls 28, 30 for example, are also within the scope of the disclosure.

In addition to the one or more temperatures sensors S1 used to monitor the temperature of the cooking accessory 50, the cooking system 20 may further employ one or more additional temperature sensors S2 to sense and communicate to the processor 76 the temperature of the environment or air within the internal heating compartment 26. As illustrated in FIGS. 2 and 3, the temperature sensor S2 is arranged in the inner sidewall 37 of the internal heating compartment 26. The temperature sensor S2 can be configured to monitor the temperature of the environment of the internal heating compartment 26 and may be located at any suitable position within the internal heating compartment 26, such as near a sidewall thereof, or near one or more of the heating elements 60, 62. In one aspect, the temperature sensor S2 is arranged within a protective cage 29, which protects the sensor S2 from contact with food particles within the internal heating compartment 26 during a cooking operation. The cage 29 include apertures which allow air circulating within the internal heating compartment 26 to pass into the cage 29 and contact the temperature sensor S2, thus allowing the temperature sensor S2 to measure the temperature of the air within the internal heating compartment 26. The temperature sensors S1, S2 of the cooking system 20 can each be a negative temperature coefficient (NTC) temperature sensors. However, other types of temperature sensors are also contemplated herein.

Figure 6:
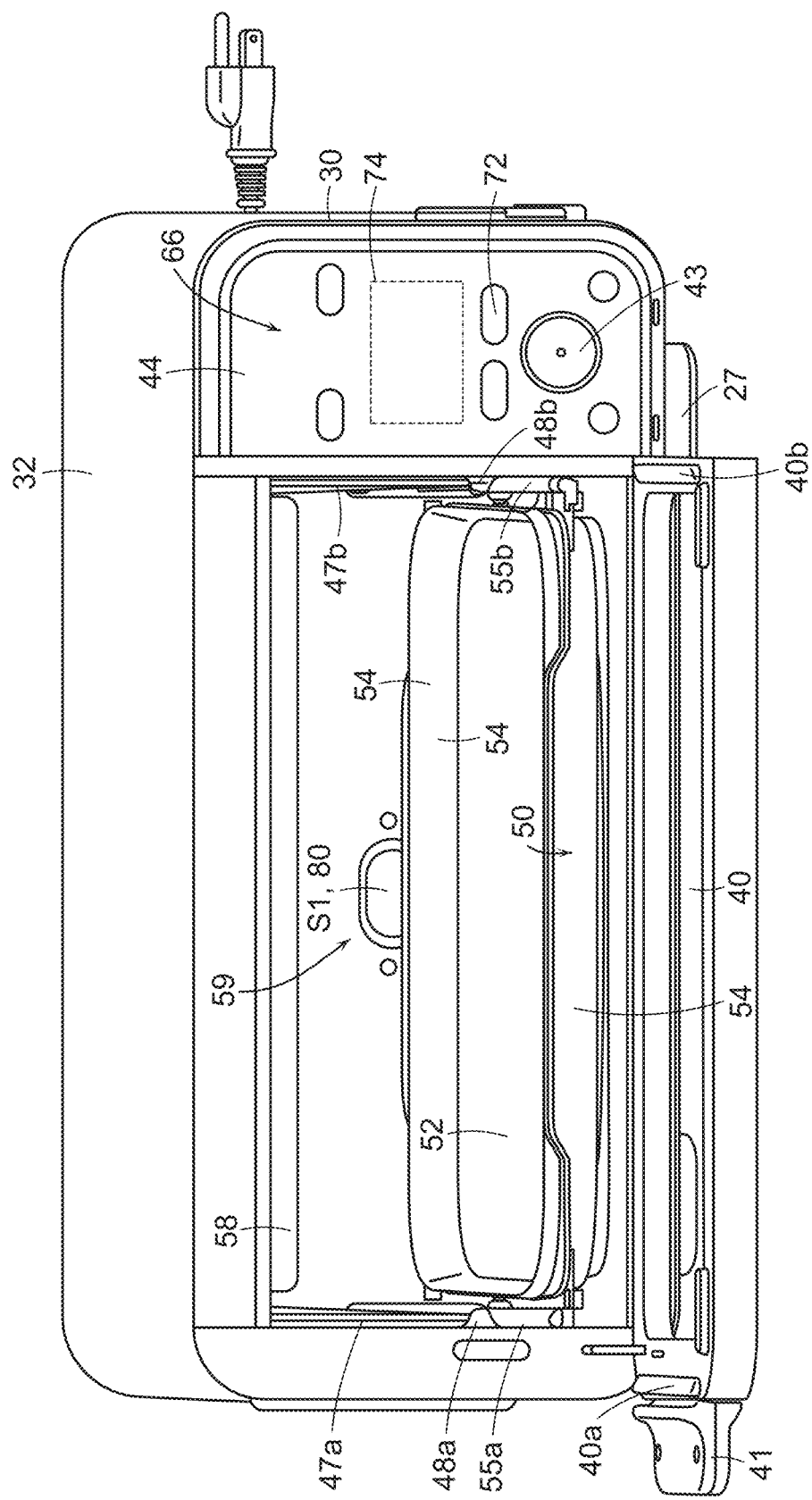
FIG. 6 is a front perspective view of the cooking system of FIG. 5 with the cooking accessory partially inserted.

With continued reference to FIG. 3 and further reference to FIGS. 5-6, an example of a cooking accessory 50, specifically a griddle, cooking sheet, or tray, is illustrated in more detail. The cooking accessory 50 may be formed from a single piece of thin material, such as sheet metal for example, or alternatively, may be formed by affixing a plurality of individual pieces together. The cooking accessory 50 includes a cooking surface 52 and a plurality of sidewalls 54 extending generally vertically from the peripheral edges of the cooking surface 52. Although the cooking accessory 50 is illustrated as having sidewalls 54 extending about the entire periphery of the cooking surface 52, embodiments where sidewalls 54 are arranged at only a portion of the edges or sides of the cooking surface 52 are also contemplated herein.

In order to position the cooking accessory properly within the internal heating volume, the cooking accessory 50 includes outwardly extending flanges 55a, 55b extending from opposite sides of the cooking accessory 50. In one aspect, the outwardly extending flanges 55a, 55b are arranged at to extend from the sidewalls 54 towards the inner sidewalls 37, 39, when the cooking accessory 50 is installed into the internal heating compartment 26. The flanges 55a, 55b may be configured to cooperate with the channels 49a, 49b of the support assemblies 47a, 47b to support the cooking accessory 50 at a desired position within the internal heating compartment 26. As illustrated in FIGS. 3 and 6, the flanges 55a, 55b are receivable within the channels 49a, 49b of the support assemblies 47a, 47b.

As stated above, the cooking system 20 as illustrated and described herein provides enhanced temperature regulation. By including at least one temperature sensor S1 configured to monitor a temperature of a cooking surface of a cooking accessory 50 and at least one temperature sensor S2 configured to monitor a temperature of an environment within the internal heating compartment 26, the temperatures of the cooking accessory 50 and the environment can be monitored independently. Further, the temperature of the cooking accessory and the environment can be controlled independently, allowing for heat to be delivered only to the portion or areas where needed.

In one aspect, the cooking system 20 is configured to allocate portions of full power during a cooking process to the appropriate set of heating elements 60, 62, should only one sensor S1, S2 be activated to monitor temperature levels. For example, if only temperature sensor S1 is activated, the control algorithm diverts full power to the heating element 62. As the cooking process continues, temperature sensor S2 can be activated. The processor 76 is configured to redirect and split power between the heating elements 60, 62 when both temperature sensors S1, S2 are activated. This "power sharing" ensures the temperature of the cooking surface 52 or the heating compartment 26 is able to respond robustly to any impulses during the cooking process, such as food loads being added or the door 40 being opened while at least one of the heating elements 60, 62 is active. In another aspect, information sensed by the temperature sensors S1, S2 can be interpreted to ensure that an appropriate power level is delivered that does not increase the risk of burning or overcooking food arranged within the heating compartment 26, while still optimizing performance of cooking the food.

In one aspect, in order to achieve a varying and appropriate level of power in the heating elements 60, 62, the cooking system 20 includes a Proportional, Integral, and Derivate (PID) controller using the readings from the temperature sensors S1, S2. The use of a PID controller can ensure the cooking system 20 responds rapidly and efficiently to temperature changes within the heating compartment 26 with the optimal amount of power, and without causing undesirable behavior, such as unstable temperature oscillations or significant overshoot of a desired temperature within the heating compartment 26.

One or more operating parameters of the cooking system 20 may be adjusted, via for example a control algorithm accessible by the processor 76, in response to the temperature detected by the one or more temperature sensors S1, S2. For example, the power provided to one or more heating elements 60, 62 may be increased or decreased to achieve a desired temperature. In an aspect, the temperature of the environment and the temperature of the cooking surface 52 may be controlled independently. The temperature of the environment within the internal heating compartment 26 may be predominantly controlled by operation of the at least one heating element 60, and the temperature of the cooking surface 52 of the cooking accessory 50 may be primarily controlled by operation of the one or more heating elements 62. However, embodiments where temperature of the environment is controlled predominantly by the at least one heating element 62 and the temperature of the cooking accessory 50 is controlled mainly by the one or more heating elements 60 or embodiments where both the environment and the cooking accessory 50 are controlled by a combination of heating elements 60, 62 are also contemplated herein.

During a cooking operation, the temperature of one or both of the environment and the temperature of the cooking surface 52 are continuously or intermittently sensed and communicated from the respective temperature sensors S1, S2 to the processor 76. Operation of the one or more heating elements 60 may be adjusted using the control algorithm in response to the temperature of the heated air, measured by the temperature sensor S2 disposed in the environment of the internal temperature compartment. For example, power provided to one or more heating element 60 may be increased if the sensed air temperature is below a set point, and the power provided to one or more of the heating elements 60 may be reduced or ceased completely if the sensed air temperature is equal to or exceeds a set point, thereby allowing the internal heating compartment 26 to cool.

When a food load is applied to the cooking surface 52, such as when a food item is installed thereon, the temperature of the cooking surface 52, and therefore the cooking accessory 50, typically drops. Accordingly, the control algorithm may be configured to determine that a food has been positioned on the cooking surface 52 when the temperature of the cooking surface 52 and/or cooking accessory 50 as monitored by the at least one temperature sensor S1 begins to decrease, but the temperature of the environment within the internal heating compartment 26 remains generally constant. In response to this determination, the control algorithm will adjust an operating parameter of one or more of the heating elements 62 located below the cooking accessory 50 to increase the temperature of the cooking surface 52.

In one aspect, the at least one temperature sensor S1 configured to monitor a temperature of the cooking surface 52 is operable to provide smoke control and indicate when the temperature of the cooking surface 52 or of the cooking accessory 50 is approaching a temperature associated with the generation of smoke (also known as the smoke point). The smoke point will vary based on the type of food positioned within the internal heating compartment 26. The at least one temperature sensor S1 configured to monitor a temperature of the cooking surface 52 may additionally be configured to cooperate with the control system 70 to prevent damage to a coating material of the cooking accessory and/or to prevent over cooking or burning of food positioned on the cooking surface 52. Based on the user selected air temperature (for specific cooking modes such as SearCrisp), the control algorithm can be configured to specify and maintain target temperatures for both of the heating elements 60, 62 independently of one another to ensure an appropriate balance of seared and roasted results of the food within the heating compartment 26.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking system comprising:
 a housing having a front opening providing access to an internal heating compartment;

a first heating element positioned in a bottom of the internal heating compartment;
a second heating element positioned within the internal heating compartment;
a cooking accessory having a cooking surface, the cooking accessory being configured to be received within the front opening and configured to move along an insertion axis extending from the front opening to a rear area of the internal heating compartment, the cooking accessory positioned above the first heating element of the internal heating compartment;
a user interface configured to receive a cooking mode from among a plurality of predetermined cooking modes based on a user selection, each of the plurality of predetermined cooking modes being associated with a required cooking accessory surface temperature and a required air temperature;
a first temperature sensor mounted in a wall of the internal heating compartment and aligned with the cooking accessory along the insertion axis, the first temperature sensor configured to contact the cooking accessory to measure a temperature of the cooking surface of the cooking accessory;
a second temperature sensor positioned within the internal heating compartment, the second temperature sensor configured to measure an air temperature of the internal heating compartment in which the cooking accessory is positioned and the second heating element is positioned; and
a controller configured to operate simultaneously:
an output of the first heating element, based on the measured temperature of the cooking surface of the cooking accessory, to achieve the required cooking accessory surface temperature associated with the selected cooking mode, and
an output of the second heating element, based on the measured air temperature of the internal heating compartment in which the cooking accessory is positioned and the second heating element is positioned, to achieve the required air temperature associated with the selected cooking mode.

2. The cooking system of claim 1, wherein the first heating element is positioned vertically between a bottom surface of the internal heating compartment and the cooking accessory.

3. The cooking system of claim 1, wherein the second heating element is positioned vertically above the cooking accessory.

4. The cooking system of claim 1, wherein the output of the second heating element is related to the measured air temperature of the internal heating compartment.

5. The cooking system of claim 1, wherein the output of the first heating element is independent from the output of the second heating element.

6. The cooking system of claim 1, wherein the wall of the internal heating compartment is a rear wall of the internal heating compartment, and the first temperature sensor is mounted within an aperture positioned in the rear wall of the internal heating compartment.

7. The cooking system of claim 1, wherein the first temperature sensor is movable relative to the internal heating compartment.

8. The cooking system of claim 1, wherein the first temperature sensor is movably biased in a first direction.

9. The cooking system of claim 8, wherein the cooking accessory is configured to be inserted into the internal heating compartment in a second direction, opposite the first direction.

10. The cooking system of claim 1, wherein the first temperature sensor is configured to move relative to the internal heating compartment and remain in contact with the cooking accessory.

11. The cooking system of claim 1, wherein the housing has a left exterior wall, a right exterior wall, a top exterior wall, a bottom exterior wall, and a rear exterior wall that define a hollow box;
the front opening defines a front of the hollow box; and
the hollow box defines the internal heating compartment.

12. The cooking system of claim 1, wherein the cooking accessory is configured to directly contact the first temperature sensor when inserted into the internal cooking compartment; and
the first temperature sensor is configured to directly contact only one cooking accessory at a time.

13. The cooking system of claim 1, wherein the plurality of predetermined cooking modes includes toast, bake, broil, grill, warm, reheat, and steam cook.

14. The cooking system of claim 1, wherein the plurality of predetermined cooking modes includes air frying, sear crisping, rapid baking, air roasting, and broiling.

15. The cooking system of claim 1, wherein the controller is configured to operate the outputs of the first heating element and the second heating element such that the first heating element and the second heating element are simultaneously outputting heat that cooks a food product arranged on the cooking accessory and located in the internal heating compartment.

16. A cooking system comprising:
a housing having an internal heating compartment;
a cooking accessory having a cooking surface, the cooking accessory configured to be removably received within the internal heating compartment and configured to move along an insertion axis extending from a front opening of the internal heating compartment to a rear area of the internal heating compartment;
a user interface configured to receive a cooking mode from among a plurality of predetermined cooking modes based on a user selection, each of the plurality of predetermined cooking modes being associated with a required cooking accessory surface temperature and being associated with a required air temperature;
a first heating element positioned in a bottom of the internal heating compartment and, with the cooking accessory received within the internal heating compartment, below the cooking accessory;
a second heating element positioned within the internal heating compartment and, with the cooking accessory received within the internal heating compartment, above the cooking accessory;
a first temperature sensor mounted within a wall of the internal heating compartment and aligned with the cooking accessory along the insertion axis, the first temperature sensor configured to measure a temperature of the cooking surface of the cooking accessory;
a second temperature sensor positioned within the internal heating compartment and configured to measure an air temperature of the internal heating compartment in which the cooking accessory is positioned and the first and second heating elements are positioned; and a controller configured to operate simultaneously:
: an output of the first heating element, based on the measured temperature of the cooking surface of the cooking accessory, to achieve the required cooking accessory surface temperature associated with the selected cooking mode, and
: an output of the second heating element, based on the measured air temperature of the internal heating compartment, to achieve the required air temperature associated with the selected cooking mode.

17. The cooking system of claim 16, wherein the output of the first heating element is independent of the output of the second heating element.

18. The cooking system of claim 16, wherein the first temperature sensor is movable relative to the internal heating compartment.

19. The cooking system of claim 16, wherein the first temperature sensor is configured to measure the temperature of and directly contact the cooking accessory;
: the first temperature sensor is configured to directly contact only one cooking accessory at a time; and
: the controller is configured to operate the outputs of the first heating element and the second heating element such that the first heating element and the second heating element are simultaneously outputting heat that cooks a food product arranged on the cooking accessory and located in the internal heating compartment.

* * * * *